United States Patent
Steele et al.

(10) Patent No.: US 9,260,644 B2
(45) Date of Patent: Feb. 16, 2016

(54) HEAT TRANSFER SYSTEM WITH AQUEOUS HEAT TRANSFER FLUID

(71) Applicant: Hamilton Sundstrand Space Systems International Inc., Windsor Locks, CT (US)

(72) Inventors: John W. Steele, New Hartford, CT (US); Daniel Montefusco, Manchester, CT (US); Barbara M. Peyton, Windsor, CT (US); Jerome D. Varsik, Barkhamsted, CT (US)

(73) Assignee: HAMILTON SUNDSTRAND SPACE SYSTEMS INTERNATIONAL, INC., Windsor Locks, CT (US)

( * ) Notice: Subject to any disclaimer, the term of this patent is extended or adjusted under 35 U.S.C. 154(b) by 504 days.

(21) Appl. No.: 13/855,378

(22) Filed: Apr. 2, 2013

(65) Prior Publication Data
US 2014/0290912 A1    Oct. 2, 2014

(51) Int. Cl.
*C09K 5/10*    (2006.01)
*F28D 15/00*   (2006.01)
*C23F 11/08*   (2006.01)

(52) U.S. Cl.
CPC . *C09K 5/10* (2013.01); *C23F 11/08* (2013.01); *F28D 15/00* (2013.01)

(58) Field of Classification Search
None
See application file for complete search history.

(56) References Cited

U.S. PATENT DOCUMENTS 5,997,763 A * 12/1999 Pabon et al. ............... 252/79
2012/0111536 A1   5/2012 Steele et al.

* cited by examiner

*Primary Examiner* — Necholus Ogden, Jr.
(74) *Attorney, Agent, or Firm* — Cantor Colburn LLP

(57) ABSTRACT

According to one aspect of the invention, a heat transfer system comprises a heat transfer fluid circulation loop. The heat transfer system includes a heat exchanger disposed in the heat transfer fluid circulation loop. The heat transfer fluid is an aqueous solution having a pH of 7.8 to 8.0 that comprises from 1.00 wt. % to 1.20 wt. % of a buffer composition comprising sodium and/or potassium salts of borate, carbonate, sodium bicarbonate, from 0.40 wt. % to 0.60 wt. % of a straight chain aliphatic dicarboxylic acid, from 0.90 wt. % to 1.10 wt. % of a branched aliphatic carboxylic acid, from 0.40 wt. % to 0.60 wt. % of an aromatic carboxylic acid, from 0.04 wt. % to 0.08 wt. % of a molybdate salt, and from 0.01 wt. % to 0.03 wt. % of an aldehyde biocide, based on the total weight of the heat transfer fluid.

20 Claims, 1 Drawing Sheet

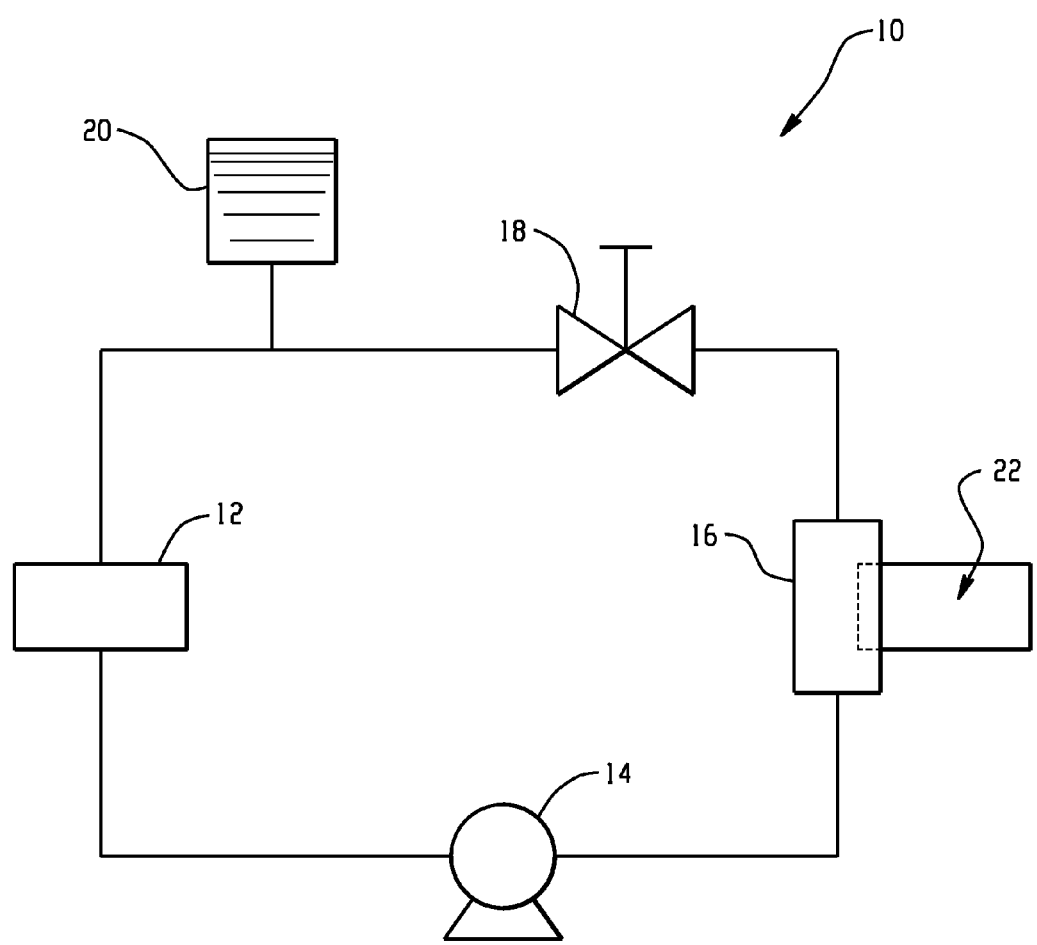

HEAT TRANSFER SYSTEM WITH AQUEOUS HEAT TRANSFER FLUID

BACKGROUND OF THE INVENTION

The subject matter disclosed herein generally relates to heat transfer systems and, more particularly, to heat transfer systems that include an aluminum surface in contact with a heat transfer fluid.

Heat transfer systems are widely used in various applications, including but not limited to heat transfer systems for environmental heating and cooling in aerospace applications, automotive, industrial, residential, and electronics, to name a few. Heat transfer systems often utilize a heat transfer fluid that circulates between two or more heat exchangers to transfer heat between environmental spaces. Many such heat transfer systems include one or more aluminum components in contact with the heat transfer fluid. Aluminum alloys offer durability, malleability, high strength to weight ratio, and thermal conductivity, which make it a desirable material for heat transfer system components such as heat exchangers, tubes, fins, etc.

Many different types of heat transfer fluids have been used or proposed for use in various types of heat transfer systems. Organic liquids such as halogenated hydrocarbons (e.g., R-134a (tetrafluoroethane), R-1234 (tetrafluoropropene)) have been used in many systems. However, such fluids, although they offer improvements over prior chlorinated fluorocarbons, are still subject to toxicity, flammability, lower thermal performance than water, and environmental issues. Additionally, they are often not suitable for use in heat transfer systems in enclosed environments such as aerospace or submarine environments, where leaks or other accidental release into the enclosed environmental space would be problematic from an occupant health perspective. Aqueous-based heat transfer fluids containing glycols such as propylene glycol have also been used. Such fluids can provide benefits over organic liquids with respect to toxicity, flammability, thermal performance and environmental issues. However, they are not suitable for some heat transfer systems, especially those with a high surface area of aluminum, where corrosion becomes a challenge. For example, propylene glycol acts to reduce the freezing point temperature of the heat transfer fluid. In PCM (phase change material) heat transfer systems where the latent heat of a phase change material is used to store and release thermal energy, the freezing point suppression imparted by the glycol to an aqueous heat fluid can be problematic. In other systems, such as capillary coolant systems used for cooling lasers or heat-generating manufacturing tools, the glycol may have a detrimental effect on the surface active properties of the coolant needed for proper capillary action. Also, the use of aqueous based coolants results in a need to control microbial growth.

Although the above-described and other heat transfer fluids can be effective in various applications, new and different alternatives are always well received that might be more appropriate for or function better in certain environments or could be less costly or more effective.

BRIEF DESCRIPTION OF THE INVENTION

According to one aspect of the invention, a heat transfer system comprises a heat transfer fluid circulation loop. The heat transfer system includes a heat exchanger disposed in the heat transfer fluid circulation loop. The heat transfer fluid is an aqueous solution having a pH of 7.8 to 8.0 that comprises from 1.00 wt. % to 1.20 wt. % of a buffer composition comprising sodium and/or potassium salts of borate, carbonate, and bicarbonate, from 0.40 wt. % to 0.60 wt. % of a straight chain aliphatic dicarboxylic acid, from 0.90 wt. % to 1.10 wt. % of a branched aliphatic carboxylic acid, from 0.40 wt. % to 0.60 wt. % of an aromatic carboxylic acid, from 0.04 wt. % to 0.08 wt. % of a molybdate salt, and from 0.01 wt. % to 0.03 wt. % of an aldehyde biocide, based on the total weight of the heat transfer fluid.

According to another aspect of the invention, a method of operating a heat transfer system comprises circulating a heat transfer fluid through a heat exchanger disposed in a heat transfer circulation loop, wherein the heat transfer fluid is an aqueous solution having a pH of 7.8 to 8.0 that comprises from 1.00 wt. % to 1.20 wt. % of a buffer composition comprising sodium and/or potassium salts of borate, carbonate, and bicarbonate, from 0.40 wt. % to 0.60 wt. % of a straight chain aliphatic dicarboxylic acid, from 0.90 wt. % to 1.10 wt. % of a branched aliphatic carboxylic acid, from 0.40 wt. % to 0.60 wt. % of an aromatic carboxylic acid, from 0.04 wt. % to 0.08 wt. % of a molybdate salt, and from 0.01 wt. % to 0.03 wt. % of an aldehyde biocide, based on the total weight of the heat transfer fluid.

According to another aspect of the invention, a heat transfer fluid comprises, in an aqueous solution having a pH of 7.8 to 8.0, from 1.00 wt. % to 1.20 wt. % of a buffer composition comprising sodium and/or potassium borate, sodium carbonate, and sodium bicarbonate, from 0.40 wt. % to 0.60 wt. % of a straight chain aliphatic dicarboxylic acid, from 0.90 wt. % to 1.10 wt. % of a branched aliphatic carboxylic acid, from 0.40 wt. % to 0.60 wt. % of an aromatic carboxylic acid, from 0.04 wt. % to 0.08 wt. % of a molybdate salt, and from 0.01 wt. % to 0.03 wt. % of an aldehyde biocide, based on the total weight of the heat transfer fluid.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawing in which:

The FIGURE depicts a schematic diagram of an exemplary heat transfer system.

DETAILED DESCRIPTION OF THE INVENTION

Referring now to the FIGURE, an exemplary heat transfer system with a heat transfer fluid circulation loop is shown in block diagram form in the FIGURE. As shown in the FIGURE, heat exchange system 10 includes heat source 12, pump 14, heat exchanger 16, flow control means 18 and fluid reservoir 20. Generally speaking, pump 14 pumps fluid through heat exchange system 10. The flow of fluid through heat exchange system 10 is controlled by pump 14 and flow control means 18. Fluid is added to or removed from heat exchange system 10 via fluid reservoir 20. Heat exchanger 16 is a cooling type heat exchanger for cooling the fluid in heat exchange system 10. Heat exchanger 16 is in fluid communication with coolant loop 22. For the reasons stated above, one or more components of heat exchange system 10 such as pump 14, heat exchanger 16, flow control means 18 or coolant loop 22 contain surfaces having high aluminum and/or nickel surface areas. As a result of the large amounts of aluminum and/or nickel present in components of heat exchange system 10, the component surfaces are subject to corrosion and the aforementioned problems when conventional aqueous-based coolants are used. To cool these component surfaces and prevent unwanted corrosion, heat exchange system 10 contains the aqueous-based coolant described above.

In some embodiments, the heat transfer system includes at least one aluminum surface in contact with the heat transfer fluid. "Aluminum" refers to pure aluminum as well as aluminum alloys (e.g., alloys in which aluminum is the predominant metal). Depending on the temperature and specific function of a component or system that requires heating or cooling, the component or system may contain surfaces with large amounts of aluminum. The benefits of aluminum (high strength-to-weight ratio, durability, malleability) allow for size and/or weight reduction compared to other materials. For example, aluminum microchannel heat exchangers can be used as an alternative to conventional heat exchangers, and can provide beneficial size, weight, and heat transfer efficiency. The smaller volume of the heat exchanger and the lower density of aluminum also contribute to reduce the overall weight of the system, often considered a critical design parameter for aircraft and spacecraft. Microchannel heat exchangers typically provide small clearances between component surfaces and small gaps in coolant flow paths. In some heat exchangers, gaps between fins can be as low as about 0.5 mm (0.020 inches), while cold plates can have gaps as low as about 0.6 mm (0.025 inches). Flow control valves can have gaps as small as about 0.3 mm (0.012 inches), and pumps can have clearances between the bushing and shaft between about 0.025 mm (0.001 inches) and about 0.04 mm (0.0015 inches). These clearances and gaps can be sensitive to coolant precipitates and aluminum corrosion products. Precipitates within the aqueous-based coolant and dislodged corrosion products can block these small gaps to impede, restrict or block coolant flow.

Various components in the heat transfer system can have aluminum surfaces in contact with the heat transfer fluid, including but not limited to cold plates, heat exchangers, and/or heat transfer fluid flow conduits. Heat exchangers can themselves include various sub-components such as manifolds, heat transfer fluid flow tubes or channels, and fins in thermal contact with the heat transfer fluid flow tubes or channels. Any of the above components can be include aluminum surfaces in contact with the heat transfer fluid. The listed components are exemplary, and the system can contain other aluminum components in contact with the heat transfer fluid.

The heat transfer systems described herein can have significant amounts of aluminum surface area. In some embodiments, the ratio of aluminum surface area to coolant volume ratio is greater than or equal to 1.0 $cm^2$ aluminum surface area per mL of coolant, more specifically greater than or equal to 2.0 $cm^2$ aluminum surface area per mL of coolant, and even more specifically greater than or equal to 4.0 $cm^2$ aluminum surface area per mL of coolant. In one exemplary embodiment, the aluminum surface area to coolant volume ratio is about 4.7 $cm^2$ aluminum surface area per mL of coolant (12 square inches per cubic inch) in a flowing system and 34.6 $cm^2$/mL (88 square inches per cubic inch) in a static condition. Such levels of aluminum in the system can create particularly onerous demands on heat transfer fluid performance with respect to corrosion resistance. Due to the high aluminum surface area, some commonly used additives can be omitted from the aqueous-based coolant. For example, materials such as copper and carbon steel are not routinely used in applications such as spacecraft applications, with aluminum often used instead. Therefore, the aqueous-based coolant does not need to contain additives that specifically inhibit corrosion of these materials. The omission of these additives removes their potential unwanted effects from the aqueous-based coolant. For instance, azoles and nitrites can potentially be detrimental to surfaces in some spacecraft applications. Azole/organic acid reaction products can contribute to the fouling of filters used in heat transfer systems. Nitrites can reduce to ammonia and shift the pH of the aqueous-based coolant above its effective range in systems having high aluminum surface area, which can also cause the coolant to react negatively with aluminum surfaces. In exemplary embodiments, the aqueous-based coolant is free of azoles and nitrites.

As described herein, the pH of the solution is maintained in the range of 7.8 to 8.0, more specifically at about 7.9. The target pH can be achieved with a combination of an appropriate amount of base such as potassium hydroxide in combination with a buffer composition. The buffer composition comprises sodium and/or potassium salts of borate, carbonate, and bicarbonate in amounts ranging from 1.00 wt. % to 1.20 wt. % more specifically from 1.09.% to 1.12 wt. %, based on the total weight of the heat transfer fluid. The relative proportion of the components of the buffer composition can be optimized based on solubility in the working range of the desired coolant and corrosion inhibition needs. In more specific embodiments, the buffer comprises sodium borate, sodium carbonate, and sodium bicarbonate. In some embodiments, the heat transfer fluid comprises from 0.10 wt. % to 0.40 wt. % and more specifically from 0.20 wt. % to 0.28 wt. % of sodium borate, from 0.10 wt. % to 0.40 wt. % and more specifically from 0.19 wt. % to 0.27 wt. % of sodium carbonate, and from 0.40 wt. % to 0.80 wt. % and more specifically from 0.58 wt. % to 0.66 wt. % of sodium bicarbonate, based on the total weight of the heat transfer fluid. In some, more specific embodiments, the buffer composition comprises from 0.20 wt. % to 0.28 wt. % of sodium borate, from 0.19 wt. % to 0.27 wt. % of sodium carbonate, and from 0.58 wt. % to 0.66 wt. % of sodium bicarbonate, based on the total weight of the buffer composition.

As described herein, the heat transfer fluid comprises a mixture of organic acids, more specifically from 0.40 wt. % to 0.60 wt. % of a straight chain aliphatic dicarboxylic acid, from 0.90 wt. % to 1.10 wt. % of a branched aliphatic carboxylic acid, and from 0.40 wt. % to 0.60 wt. % of an aromatic carboxylic acid. In more specific embodiments, the heat transfer fluid comprises from 0.45 wt. % to 0.55 wt. % of a straight chain aliphatic dicarboxylic acid, from 0.95 wt. % to 1.05 wt. % of a branched aliphatic carboxylic acid, and from 0.45 wt. % to 0.55 wt. % of an aromatic carboxylic acid. Examples of straight chain aliphatic dicarboxylic acids include $C_8$-$C_{12}$ dicarboxylic acids such as suberic acid, azeleic acid, sebacic acid, and dodecanedioic acid. In a more specific embodiment, the straight chain dicarboxylic acid is sebacic acid. Examples of branched aliphatic carboxylic acids include $C_6$-$C_{10}$ monocarboxylic acids having at least one branch therein, such as 2-ethylhexanoic acid, 3-ethyl-6-methylcotanedioic acid, 4-methyl pentanoic acid, and 2,3-dimethylhexanoic acid. Examples of aromatic carboxylic acids include benzoic acid, benzoyl acid, phthaloyl acid, and phthalic acid The heat transfer fluid also includes from 0.04 wt. % to 0.08 wt. % of a molybdate salt, more specifically from 0.055 wt. % to 0.065 wt. % of a molybdate salt. Molybdate salts contain an oxoanion of molybdenum in its highest oxidation state of 6. Molybdate oxoanions can be provided in solution by alkali metal molybdates, alkali earth molybdates, ammonium molybdate and organic molybdate compounds. An exemplary source of molybdate salt is sodium molybdate. Sodium molybdate is a non-oxidizing anodic inhibitor having the molecular formula $Na_2MoO_4$. Sodium molybdate is often found as a dihydrate ($Na_2MoO_4.2H_2O$).

The heat transfer fluid also includes from 0.01 wt. % to 0.03 wt. % of an aldehyde biocide, more specifically from 0.015 wt. % to 0.025 wt. % of an aldehyde biocide. Virtually any aldehyde capable of being dissolved in the solution can function as a biocide. Specific examples of aldehyde biocides include glutaraldehyde and ortho-phthaldehyde. In a more specific embodiment, the aldehyde biocide is ortho-phthaldehyde.

The heat transfer system described herein can be used, for example, to condition air in an interior space by either transferring heat from the interior space to an outside environment or by transferring heat from an outside environment to the conditioned interior space, and as used herein, the terms "coolant" and "refrigerant" are used interchangeably with the term "heat transfer fluid", which may be used for either heating or cooling a conditioned space. In some embodiments, the conditioned interior space can be a sealed interior space such as a space vehicle, submarine, or other hermetically sealed environment. In some embodiments, a portion of the heat transfer fluid in the system is in a frozen state.

The invention is further illustrated by the following non-limiting example.

EXAMPLE 1

Stability Testing

Into a 2-liter volumetric flask containing about 1.75 liters of deionized water, the following ingredients were added with stirring until dissolution: 4.88 g $Na_2B_4O_7.10H_2O$ (1000-ppm $B_4O_7^{2-}$), 4.94 g $Na_2CO_3$ (1400-ppm $CO_3^{2-}$), and 12.1 g $NaHCO_3$ (4400-ppm $HCO_3^-$). 400 mg of ortho-phthalaldehyde were added to the flask followed by additional deionized water to yield 2 liters of solution. 1 liter of the above solution was added to a 2-liter beaker with a magnetic stirring bar, to which was added 11.0-mL 2-ethylhexanoic acid (1.0% w/w), 5.0 g benzoic acid (0.5% w/w), 5.0 g sebacic acid (0.5% w/w), and 600 mg sodium molybdate (0.06% w/w). The mixture was stirred for 24 hours to completely dissolve the ingredients. The pH of the solution was adjusted to 7.9 by adding potassium hydroxide flakes until a pH ≥7, and then adding 1.0 N and then 0.1N potassium hydroxide solution drop-wise to reach the final pH of 7.9.

A 1500 ml volume of the above solution was tested for stability over a 60-day period by initially increasing the temperature to 60° C. for 24 hours followed by 24 hours at room temperature. Thereafter, the solution was subjected to a temperature of 1.7° C. for 24 hours and then returned to room temperature for the balance of the 60-day period. The solution remained clear through the test protocol with no signs of precipitation or stratification. Thirteen days into the test, a 300 ml aliquot of the solution was separated from the main sample and frozen at −20° C. for 24 hours. This solution was returned to room temperature and maintained at room temperature for the remaining 47 days of the 60-day period, with no observable precipitation or stratification.

EXAMPLE 2

Corrosion Testing

The above solution was tested for corrosion by abrading 1 $cm^2$ test samples of aluminum alloy 6951 with 400 grit sand paper followed by cleaning in Vertrel MCA®. The test samples were soaked in the solution for about 2.5 weeks, followed by cyclic potentiodynamic polarization testing according to ASTM G5 using Teflon crevice-free washers. Data was collected and plotted as the log of corrosion current in amperes per $cm^2$ as a function of polarization potential in volts vs. a saturated calomel electrode. Data manipulation was performed using Tafel extrapolation according to ASTM G102, using equivalent weight of 6951 Aluminum Alloy of 9.032, the density is 2.7 $g/cm^3$, and a Stern Greary coefficient of 26 mV for Tafel Extrapolation. This gave corrosion rates of 0.229 MPY (milli-inches per year) for a first trial and 0.255 MPY for a second trial. For comparison purposes, corrosion of aluminum alloy 6951 in water at a pH of 7.9 but without the composition of the invention has been reported at a substantially higher 3.9 MPY.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A heat transfer system comprising a heat exchanger disposed in a heat transfer fluid circulation loop, wherein the heat transfer fluid is an aqueous solution having a pH of 7.8 to 8.0 that comprises:
   1.00 wt. % to 1.20 wt. % of a buffer composition comprising sodium and/or potassium salts of borate, carbonate, and bicarbonate;
   0.40 wt. % to 0.60 wt. % of a straight chain aliphatic dicarboxylic acid;
   0.90 wt. % to 1.10 wt. % of a branched aliphatic carboxylic acid;
   0.40 wt. % to 0.60 wt. % of an aromatic carboxylic acid;
   0.04 wt. % to 0.08 wt. % of a molybdate salt; and
   0.01 wt. % to 0.03 wt. % of an aldehyde biocide;
   each weight percentage based on the total weight of the heat transfer fluid.

2. The heat transfer system of claim 1, wherein the heat transfer system includes a surface comprising aluminum in contact with the heat transfer fluid.

3. The heat transfer system of claim 2, wherein the surface comprising aluminum is a component of a heat exchanger, a cold plate, or a fluid conduit.

4. The heat transfer system of claim 2, comprising a plurality of heat exchangers including a surface comprising aluminum in contact with the heat transfer fluid.

5. The heat transfer system of claim 2, having a ratio of aluminum surface are to heat transfer fluid volume of at least 1.0 $cm^2/ml$.

6. The heat transfer system of claim 1, wherein the buffer composition comprises sodium borate, sodium carbonate, and sodium bicarbonate.

7. The heat transfer system of claim 5, wherein the buffer composition comprises from 0.10 wt. % to 0.40 wt. % of sodium borate, from 0.10 wt. % to 0.40 wt. % of sodium carbonate, and from 0.40 wt. % to 0.80 wt. % of sodium bicarbonate, based on the total weight of the heat transfer fluid.

8. The heat transfer system of claim 1, wherein the straight chain aliphatic dicarboxylic acid is a $C_8$-$C_{12}$ dicarboxylic acid, the branched aliphatic carboxylic acid is a $C_4$-$C_{12}$ monocarboxylic acid having at least one branch therein, and the aromatic carboxylic acid is benzoic acid.

9. The heat transfer system of claim 7, wherein the straight chain aliphatic dicarboxylic acid is sebacic acid and the branched aliphatic carboxylic acid is 2-ethylhexanoic acid.

10. The heat transfer system of claim 1, wherein the aldehyde biocide is ortho-phthaldehyde or glutaraldehyde.

11. The heat transfer system of claim 9, wherein the aldehyde is orthophthaldehyde.

12. The heat transfer system of claim 1, wherein the molybdate salt is sodium molybdate.

13. The heat transfer system of claim 1, wherein the heat transfer fluid comprises from 1.09 wt. % to 1.12 wt. % of the buffer composition, from 0.45 wt. % to 0.55 wt. % of the straight chain aliphatic dicarboxylic acid, from 0.95 wt. % to 1.05 wt. % of the branched aliphatic carboxylic acid, from 0.45 wt. % to 1.05 wt. % of benzoic acid as the aromatic carboxylic acid, from 0.055 wt. % to 0.065 wt. % of the molybdate salt, and from 0.015 wt. % to 0.025 wt. % of the aldehyde biocide, based on the total weight of the heat transfer fluid.

14. The heat transfer system of claim 1, wherein the buffer composition comprises sodium borate, sodium carbonate, and sodium bicarbonate, the straight chain aliphatic dicarboxylic acid is sebacic acid, the branched aliphatic carboxylic acid is 2-ethylhexanoic acid, the aromatic carboxylic acid is benzoic acid, the molybdate salt is sodium molybdate, and the aldehyde biocide is ortho-phthaldehyde.

15. A method of operating a heat transfer system comprising circulating a heat transfer fluid through a heat exchanger disposed in a heat transfer fluid circulation loop, wherein the heat transfer fluid is an aqueous solution having a pH of 7.8 to 8.0 that comprises:
   1.00 wt. % to 1.20 wt. % of a buffer composition comprising sodium and/or potassium salts of borate, carbonate, and bicarbonate;
   0.40 wt. % to 0.60 wt. % of a straight chain aliphatic dicarboxylic acid;
   0.90 wt. % to 1.10 wt. % of a branched aliphatic carboxylic acid;
   0.40 wt. % to 0.60 wt. % of an aromatic carboxylic acid;
   0.04 wt. % to 0.08 wt. % of a molybdate salt; and
   0.01 wt. % to 0.03 wt. % of an aldehyde biocide;
   each weight percentage based on the total weight of the heat transfer fluid.

16. The method of claim 15, wherein the heat transfer system includes a surface comprising aluminum in contact with the heat transfer fluid.

17. The method of claim 16, having a ratio of aluminum surface area to heat transfer fluid volume of at least 1.0 $cm^2$/ml.

18. The method of claim 15, wherein a portion of the heat transfer fluid is in a frozen state.

19. A heat transfer fluid, comprising, in an aqueous solution having a pH of 7.8 to 8.0:
   1.00 wt. % to 1.20 wt. % of a buffer composition comprising sodium and/or potassium salts of borate, carbonate, and bicarbonate;
   0.40 wt. % to 0.60 wt. % of a straight chain aliphatic dicarboxylic acid;
   0.90 wt. % to 1.10 wt. % of a branched aliphatic carboxylic acid;
   0.40 wt. % to 0.60 wt. % of an aromatic carboxylic acid;
   0.04 wt. % to 0.08 wt. % of a molybdate salt; and
   0.01 wt. % to 0.03 wt. % of an aldehyde biocide;
   each weight percentage based on the total weight of the heat transfer fluid.

20. The heat transfer fluid of claim 19, wherein the buffer composition comprises sodium borate, sodium carbonate, and sodium bicarbonate, the straight chain aliphatic dicarboxylic acid is sebacic acid, the branched aliphatic carboxylic acid is 2-ethylhexanoic acid, the aromatic carboxylic acid is benzoic acid, the molybdate salt is sodium molybdate, and the aldehyde biocide is ortho-phthaldehyde.

* * * * *